June 11, 1963  H. I. PODELL  3,092,917
ABACUS
Filed June 15, 1961
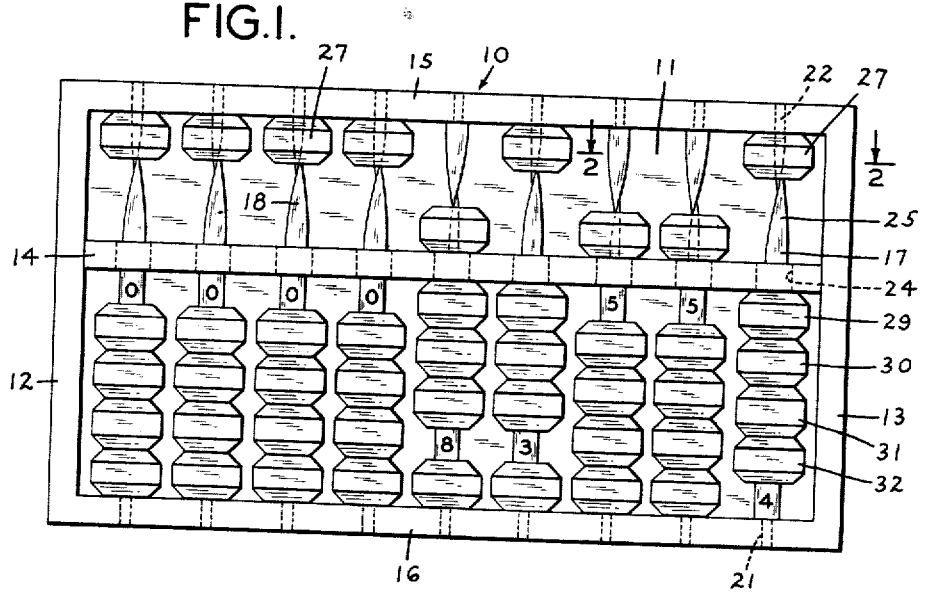
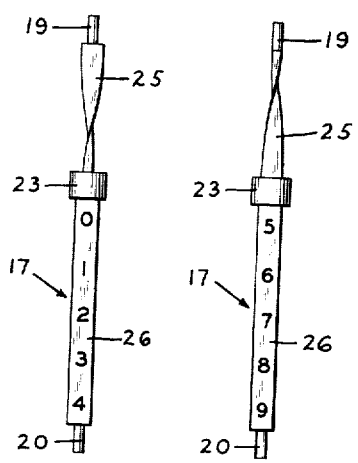
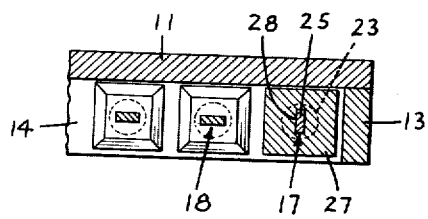
INVENTOR
HOWARD I. PODELL
BY
HIS ATTORNEYS

United States Patent Office 3,092,917
Patented June 11, 1963

3,092,917
ABACUS
Howard I. Podell, 1319 Stonybrook Ave.,
Mamaroneck, N.Y.
Filed June 15, 1961, Ser. No. 117,394
7 Claims. (Cl. 35—33)

This invention relates to educational devices and it relates particularly to an improved form of educational aid for teaching mathematics.

In the teaching of mathematics and other subjects, great stress is now being placed upon developing the ability of children to associate a number or a symbol with a numerical group of articles or a related subject. Thus, present day teaching methods feature drawings by teachers, exhibits, visual aids and other means for facilitating the transmission of knowledge to the children.

The abacus has not been commonly used in the Western hemisphere as a teaching aid because there is no direct association of the quantity shown on the abacus with a numerical symbol for that quantity. For the same reason the abacus is rarely used in present day accounting or calculating operations, although tests have shown that, in the hands of an expert, the abacus is faster than many adding machines.

In accordance with the present invention, an improved educational device based on the principle of the abacus is provided in which movements of the beads or calculating pieces of the device cause numerical symbols or numbers to be displayed visually corresponding to the value or values of the beads or pieces thereby indicating directly the solutions of problems involving addition, subtraction, etc. In this way, even one untutored in the use of the abacus can associate numerical values, symbols or other indicia directly with individual beads or groups of beads. The new educational device embodying the invention can be used as a manually operable and visual aid for the teaching of addition, subtraction, even multiplication, for the reason that it provides an instantaneous associaton between the quantity represented by the beads and the visible numeral or numerals representing that quantity.

As the skill of the user of my new educational device improves, it may be used in the manner of a conventional abacus for complex calculations of a difficulty normally requiring the use of an adding machine of advanced type.

Educational devices of the type embodying the present invention are simple and can be produced at relatively low cost from durable materials to render them useful over long periods of time in schools and other institutions where service conditions may be severe.

For a better understanding of the present invention reference may be had to the accompanying drawings in which:

FIGURE 1 is a front elevational view of a typical educational device of the type embodying the present invention;

FIGURE 2 is a view in section taken along line 2—2 of FIGURE 1;

FIGURE 3 is a view in front elevation of one of the spindles of the device; and

FIGURE 4 is a view in side elevation of the spindle.

As illustrated in FIGURES 1 and 2 a typical educational device embodying the present invention includes a frame 10 which may, if desired, have a backing 11 on one side thereof. Extending between the side rails 12 and 13 of the frame 10 is a dividing strip or partition 14 which is also substantially parallel to the top and bottom rails 15 and 16 of the frame. A plurality of spindles 17, 18, etc., extend through the partition 14 and have their ends mounted in recesses or openings in the rails 15 and 16.

All of the spindles are essentially the same and only one of them will be described herein.

As shown in FIGURE 1, nine spindles are mounted in the frame 10, although more or fewer may be used if desired.

By way of example, the spindle 17, as best shown in FIGURES 3 and 4, includes shaft portions 19 and 20 at its opposite end which are of circular cross-section and are received rotatably in complemental bores or holes 20 and 21 in the rails 15 and 16. Also the spindle 17 includes a cylindrical hub portion 23 which is rotatably received in the hole 24 in the partition 14. The upper portion 25 of the spindle between the shaft portion 19 and the hub 23 is twisted 90° to render it of generally helical or screw-like shape. Below the hub portion 23, the spindle 17 has a portion 26 of approximately square cross-section. One side or face of the spindle portion 26 is provided with a row of indicia or symbols, such as, the numerals 0, 1, 2, 3 and 4, while another side of the spindle displaced about 90° from the row of indicia 0 to 4, bears a second row of indicia or symbols, for example, the numerals 5, 6, 7, 8 and 9.

Mounted on the twisted portion 25 of the spindle is a bead 27 which has a rectangular hole 28 formed therein which receives slidably and non-rotatably the twisted or helical portion 25 of the spindle 17. Bead 27 as shown in FIGURE 2 is generally square in cross-section and is in sliding contact with the backing member 11, the side rail 13 or both or it may bear against other similar beads mounted on adjacent spindles to prevent rotation of the bead 27 as it is moved up and down the spindle portion 25 toward and away from the dividing strip 14. During such up or down movement, the helical or twisted shape of the portion 25 of the spindle will cause it to turn through an angle of 90°. It will be understood that the twisted portion 25 may be such as to cause the spindle 17 to rotate 180° or any other angle, and, in such case, the rows of numerals will be spaced apart through the same angle.

On the lower portion of the spindle 17 shown are mounted four beads 29, 30, 31 and 32. These beads may be of circular or other cross-section and their combined heights correspond to about ⅘ of the length of the spindle portion 26. Thus, they all can be moved from a lower position shown, for example, on spindle 18, one after another as a group or in combinations to the elevated position shown on the spindle 17 in FIGURE 1. The heights of the beads 29 to 32 and the spacing between the numerals in the rows are related as follows: Starting with the bead 27 adjacent to the upper rail 15 and all of the beads 29 to 32 in their lowest positions, (the position of the beads on the spindle 18), it will be seen that the face of the spindle portion 26 bearing numerals 0, 1, 2, 3 and 4 is directed toward the open side of the frame 10, but only the numeral 0 is visible. When the uppermost bead 29 is raised into contact with the partition 14, the numeral 1 which previously was covered by the bead 29 is now exposed and the numeral 0 is covered by the bead 29. When the bead 30 is raised into contact with the raised bead 29, the numeral 2 is exposed and numerals 0 and 1, 3 and 4 are covered. If all of the beads 29 to 32 are raised to the top of the stem portion 26, the numeral 4 will be exposed and all others are covered. When the bead 27 is moved into engagement with the partition 14 as shown in the second and third units from the right in FIGURE 1, the spindle 17 will be turned 90° so that the row of numerals 5, 6, 7, 8 and 9 is disposed in a position facing the open side of the frame 10. With all of the beads 29 to 32 moved on the stem to their lowermost positions, and with the bead 27 lowered, the numeral 5 is exposed. By raising the beads 29 to 32 one at a time, the numerals 6 to 9 will be exposed in succession.

It will be understood that it is possible to add, subtract, etc., by moving the beads individually or in groups toward and away from the partition 14. In any position of the beads a number is disclosed which corresponds to the number of beads that have been moved. Likewise, more complex addition, subtraction involving the carrying of numbers can be taught in direct association of numerical symbols with actual quantities (numbers of beads). The device can, of course, be used like a conventional abacus for more complex calculations.

Considerable modification of the device is possible in the material from which the components of the device are made. For example, the frame, spindles and beads can be made om metal, plastic, wood or combinations thereof. The number of beads on the lower portion of the spindle 17 can be increased from four to five and the numbers on the spindle portion 26 changed accordingly. The beads can be changed in shape and other means for rotating the spindles may be used. Moreover, the rows of symbols or indicia can be applied to other elements than the spindles, such as, for example, on sleeves on the spindles or on sleeves on the beads which can be covered or uncovered by relative movement of the beads. Accordingly, it should be understood that the specific embodiment of the invention disclosed herein should be considered as illustrative and the invention should not be considered as limited other than as defined in the following claims.

I claim:

1. An educational device comprising a frame, a partition extending transversely of said frame, at least one spindle extending across said frame substantially perpendicular to said partition, a first bead on said spindle on one side of said partition, a group of beads on said spindle on the opposite side of said partition, said beads on said spindle being selectively movable along said spindle toward and away from said partition, first and second groups of indicia corresponding to and exposed individually by selective movement of beads of said group of beads toward and away from said partition, and means responsive to movement of said first bead toward and away from said partition to move one of said groups of indicia into a position to be exposed by selective movement of beads of said group of beads and move the other group of indicia into a concealed position.

2. The educational device set forth in claim 1 in which said spindle has angularly related surfaces, each surface having different groups of indicia thereon for exposure and concealment selectively by said group of beads, said spindle and said first bead having means thereon for rotating said spindle upon movement of said first bead toward and away from said dividing strip.

3. An educational device comprising a frame having a transverse partition, at least one spindle rotatably mounted in said frame and extending substantially perpendicular to said partition, a first bead slidably mounted on said spindle on one side of said partition for movement toward and away from said partition, means for rotating said spindle in response to said movement of said first bead, a group of beads mounted slidably on said spindle on the other side of said partition for selective movement toward and away from said partition individually and in combinations, a first row of indicia on said spindle, each indicium being exposable to view by selective movement of said beads of said group along said spindle, and a second row of different indicia spaced around said spindle from said first row, each indicium being exposable to view by selective movement of said beads of said group, said rows of indicia being selectively moved from a concealed to a visible position by rotation of said spindle in response to movement of said first bead.

4. The device set forth in claim 3 in which said first row of indicia comprises numerals 0 to 4 and said row of indicia comprises numerals 5 to 9.

5. The device set forth in claim 3 in which said means for rotating said spindle comprises a helical portion on said spindle and an interfitting portion on said first bead and means for restraining said first bead against rotation.

6. The device set forth in claim 3 in which said spindle comprises a portion having at least two substantially flat surfaces extending lengthwise of said spindle, one of said rows or indicia being on and extending lengthwise of one of said faces and said other row being on and extending lengthwise of the other face.

7. An educational device comprising a frame, at least one spindle mounted on said frame, a group of beads on said spindle, said beads being slidable individually and in groups along said spindle, and a row of numbers extending lengthwise of said spindle, said numbers being covered and uncovered individually by selective movement of beads along said spindle to display a single number corresponding to the number of beads moved along said spindle.

References Cited in the file of this patent

UNITED STATES PATENTS 1,486,983     McDonald _____ Mar. 18, 1924

UNITED STATES PATENT OFFICE
CERTIFICATE OF CORRECTION

Patent No. 3,092,917                          June 11, 1963

Howard I. Podell

It is hereby certified that error appears in the above numbered patent requiring correction and that the said Letters Patent should read as corrected below.

Column 1, line 61, for "elevation" read -- elevational --; column 2, line 39, after "portion" insert -- 26 --; column 4, line 24, after "said" insert -- second --.

Signed and sealed this 7th day of January 1964.

(SEAL)
Attest:
ERNEST W. SWIDER

Attesting Officer

EDWIN L. REYNOLDS

Acting Commissioner of Patents